W. A. KOSINSKI.
SLAG REMOVING AND INDICATING MECHANISM FOR OPEN HEARTH FURNACES.
APPLICATION FILED JULY 7, 1914.

1,133,975.

Patented Mar. 30, 1915.

5 SHEETS—SHEET 1.

Witnesses

Inventor
W. A. Kosinski,
By Victor J. Evans
Attorney

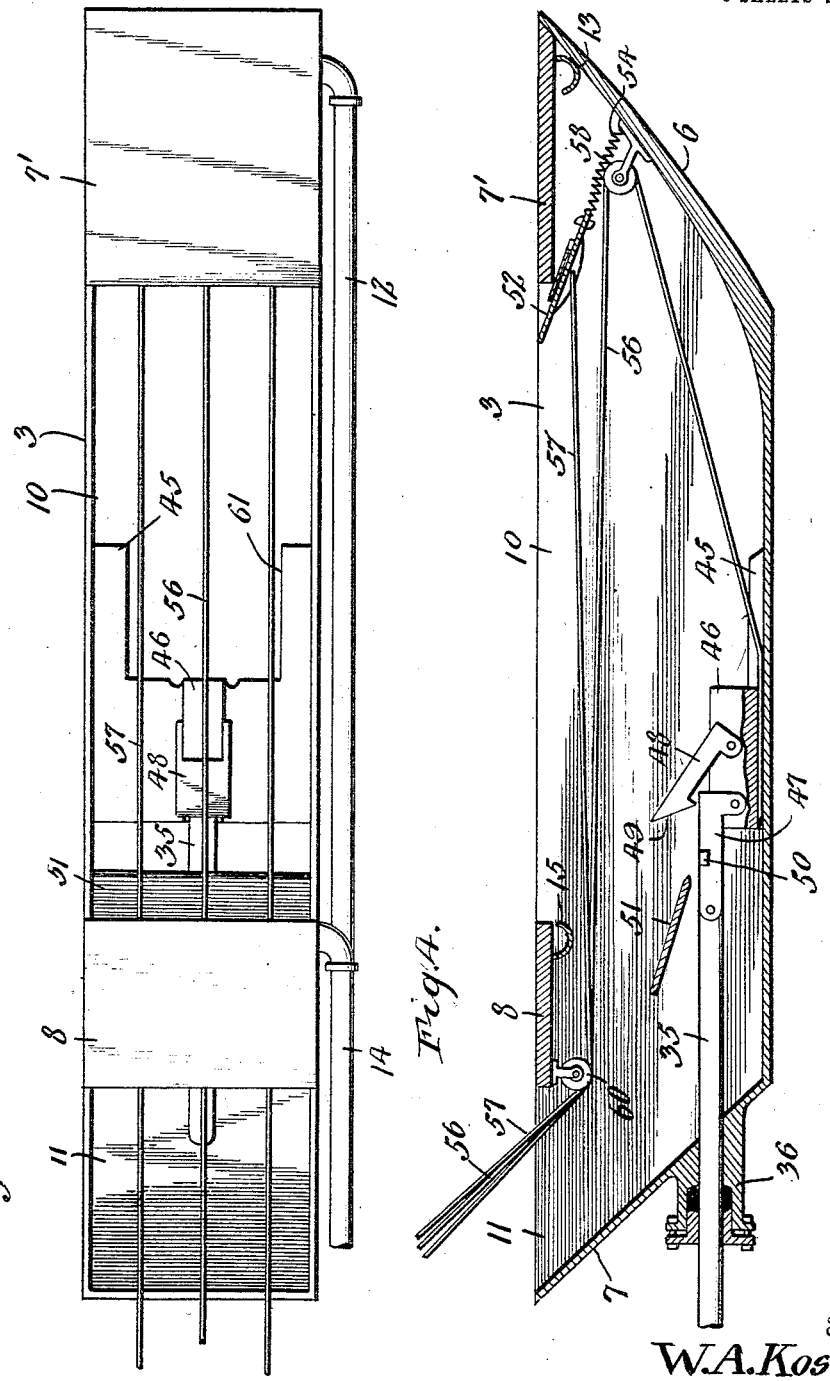

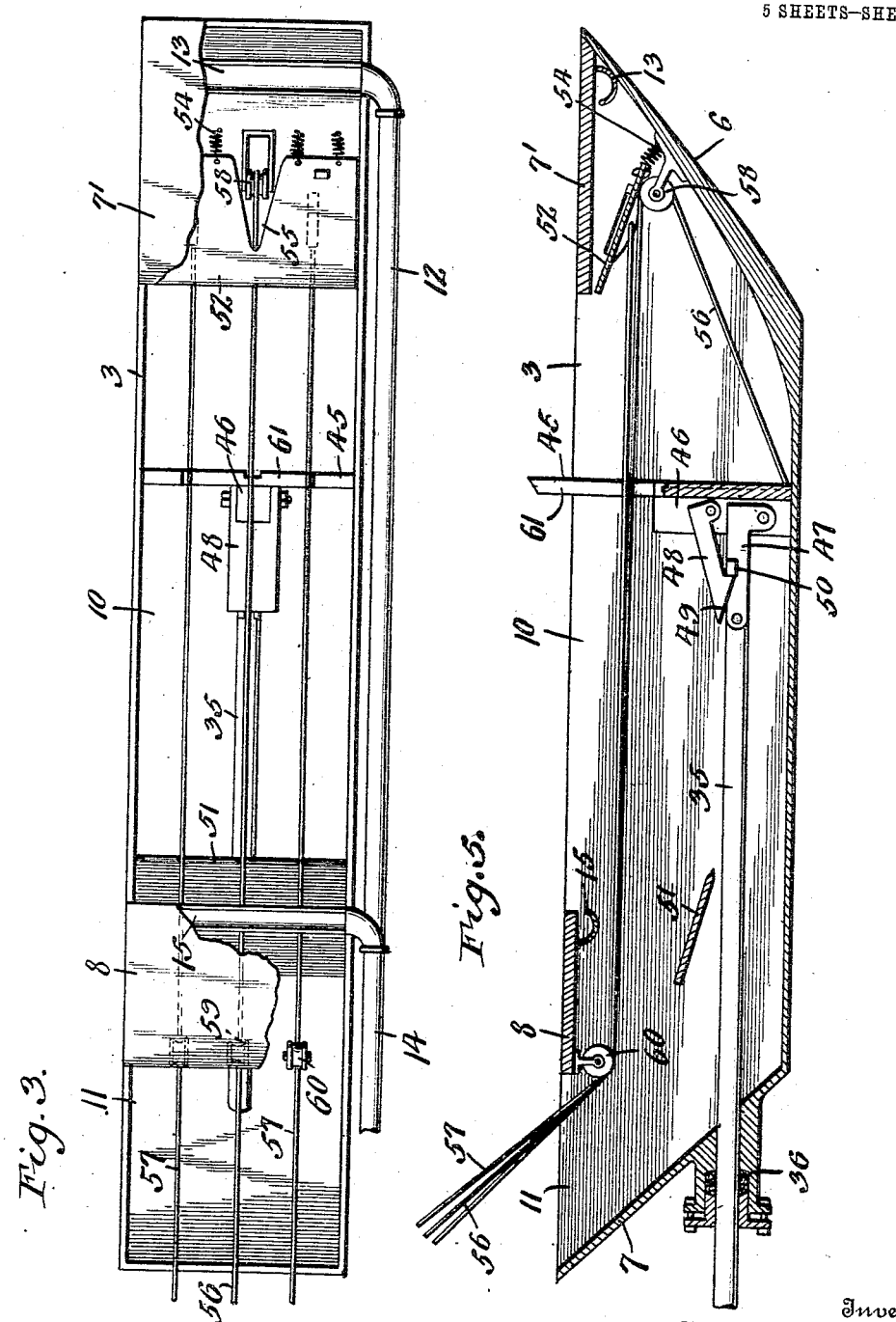

W. A. KOSINSKI.
SLAG REMOVING AND INDICATING MECHANISM FOR OPEN HEARTH FURNACES.
APPLICATION FILED JULY 7, 1914.

1,133,975.

Patented Mar. 30, 1915.
5 SHEETS—SHEET 4.

Witnesses
Inventor
W. A. Kosinski,
By Victor J. Evans
Attorney

W. A. KOSINSKI.
SLAG REMOVING AND INDICATING MECHANISM FOR OPEN HEARTH FURNACES.
APPLICATION FILED JULY 7, 1914.

1,133,975.

Patented Mar. 30, 1915.
5 SHEETS—SHEET 5.

Inventor
W. A. Kosinski,
By Victor J. Evans
Attorney

Witnesses

UNITED STATES PATENT OFFICE.

WALTER A. KOSINSKI, OF CHICAGO, ILLINOIS.

SLAG REMOVING AND INDICATING MECHANISM FOR OPEN-HEARTH FURNACES.

1,133,975.  Specification of Letters Patent.  Patented Mar. 30, 1915.

Application filed July 7, 1914. Serial No. 849,537.

*To all whom it may concern:*

Be it known that I, WALTER A. KOSINSKI, a citizen of the United States, residing at Chicago, in the county of Cook and State of Illinois, have invented new and useful Improvements in Slag Removing and Indicating Mechanism for Open-Hearth Furnaces, of which the following is a specification.

My invention relates to slag removing and indicating mechanism for open hearth steel furnaces.

One object of my invention is to provide means for circulating water through the slag box to keep the slag free and clear for discharge, for maintaining the water at a predetermined level, and for indicating when the level of the water is above or below normal in order that corrective measures may be taken.

Another object of the invention is to provide means for breaking up and discharging the slag accumulating in the slag box at predetermined intervals.

Still another object of the invention is to provide slag clearing and discharging means which will operate in a reliable and efficient manner, together with means for indicating the positions of the same from without the slag box, so that a series of clearers within the respective slag boxes of furnaces may be operated and controlled with certainty and precision.

With these and other objects in view, the invention consists of the features of construction, combination and arrangement of parts herein fully described and claimed, reference being had to the accompanying drawings in which:—

Figure 1:
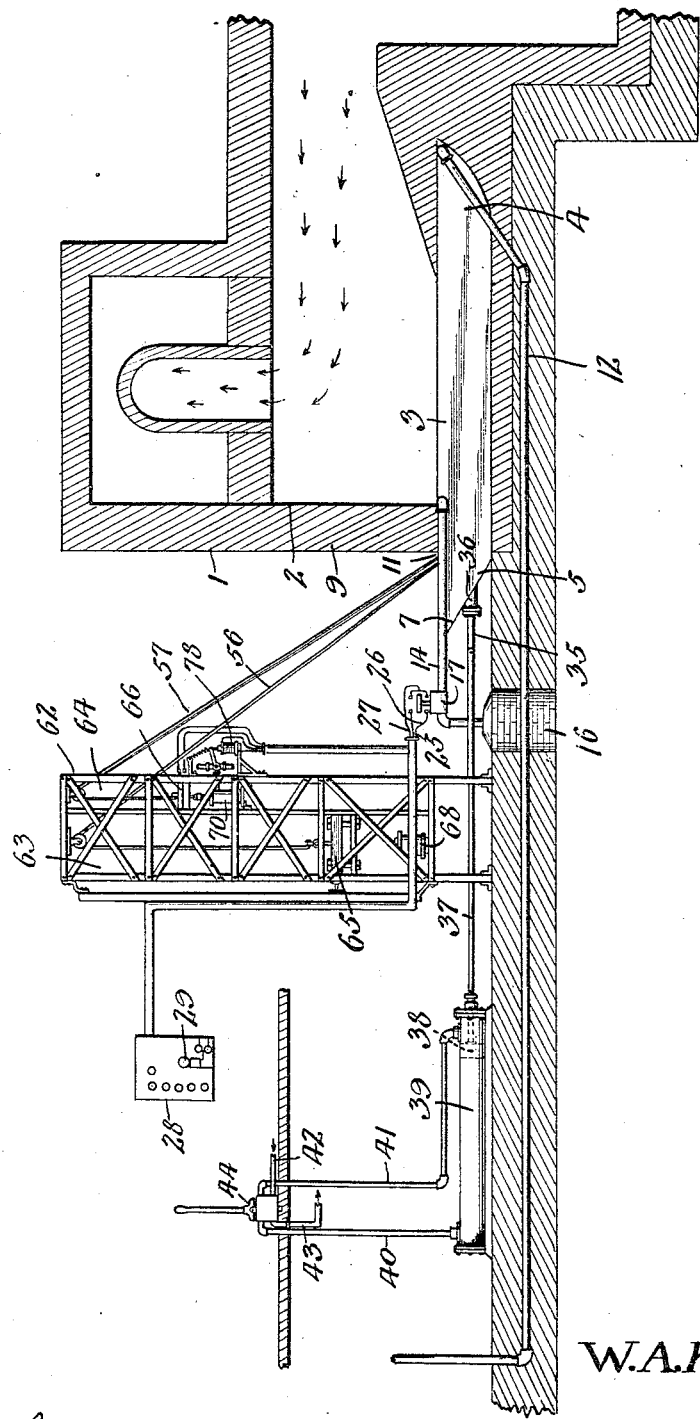
Figure 6:
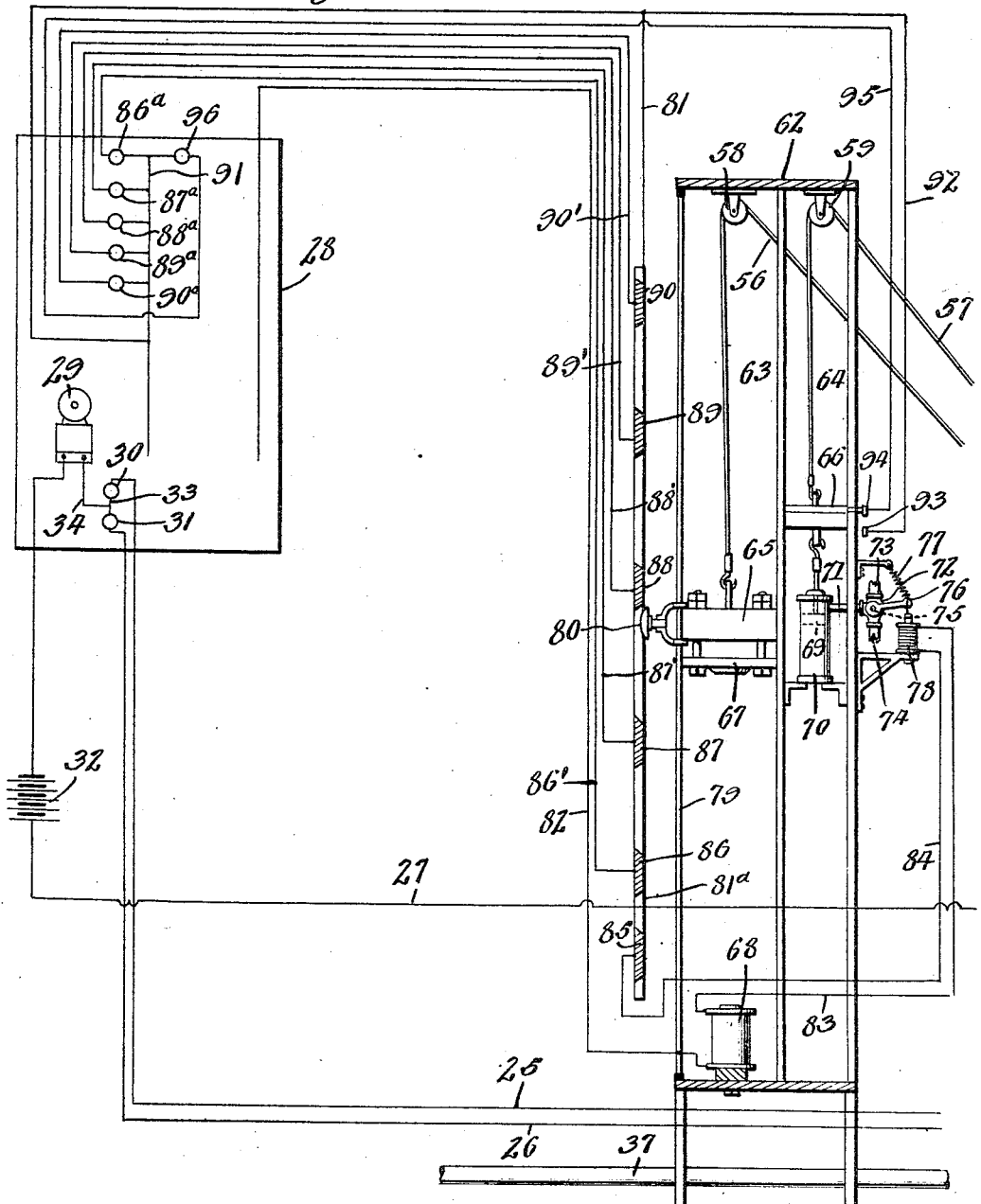
Figure 7:
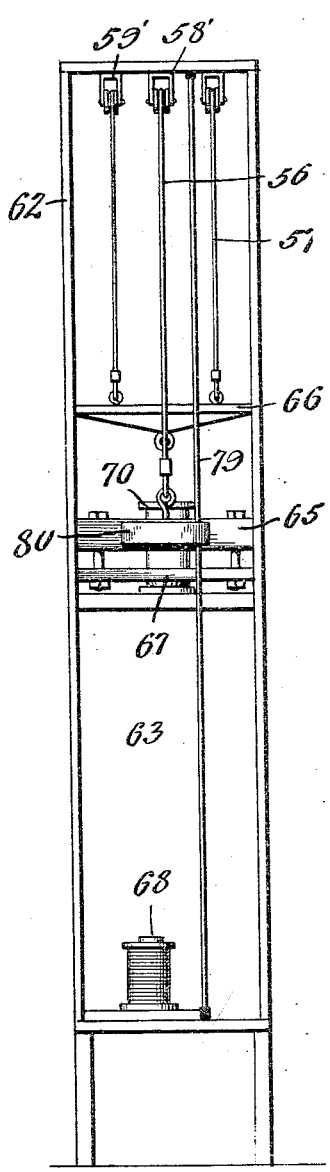
Figure 8:
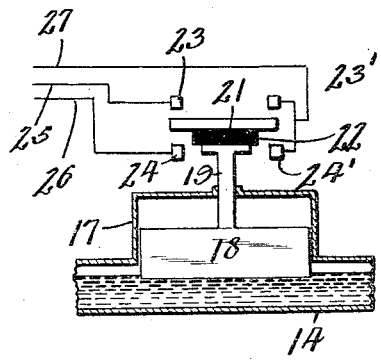
Figure 9:
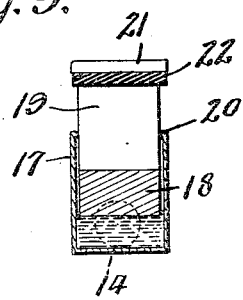
Figure 10:
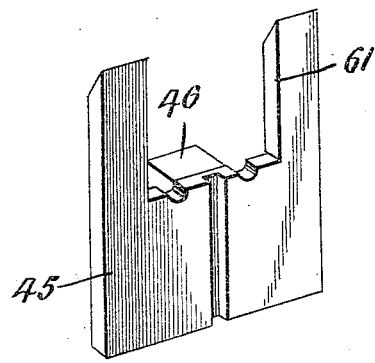

Figure 1 is a sectional elevation of a furnace and slag removing apparatus embodying my invention, showing the general arrangement of parts. Fig. 2 is a top plan view of the slag box, showing the internal parts in normal or inactive position. Fig. 3 is a sectional plan view thereof, showing the internal parts in a determined working position. Figs. 4 and 5 are vertical longitudinal sections through the slag box with the parts arranged as shown in Figs. 2 and 3. Fig. 6 is a front view of the guide frame or tower, showing also diagrammatically the electric indicating and operating devices. Fig. 7 is a side elevation of the same. Fig. 8 is a vertical longitudinal section through the float box and float. Fig. 9 is a vertical transverse section of the same. Fig. 10 is a detail view showing a feature of construction.

Referring to the drawings, 1 designates a steel furnace of the open-hearth type, and 2 one of the slag pockets thereof with which communicates a slag box or receptacle 3. This slag box or receptacle is preferably of oblong rectangular form and communicates at its top, between its end portions 4 and 5, with the bottom of the pocket 2. The end portions 4 and 5 of the slag box are contracted by sloping bottom portions 6 and 7, and above the bottom wall 6 the inner or forward end of the box is provided with a bridge portion 7′, while adjacent its rear end the box is also provided with a bridge portion 8. The bridge portion 7′ closes the upper front portion of the box, which is embedded in the brick work 8′ of the bridge wall of the slag pocket, while the bridge 8 closes the upper portion of the box at a point where the rear end of the box extends outwardly through the rear wall 9 of the furnace. Between the bridge portions 7′ and 8 the top of the box is open, as shown at 10, for the reception of the slag or ashes deposited in the pocket 2, the said slag or ashes being discharged at the rear of the box through an outlet 11.

In practice, the box 3 is kept filled with water, supplied under a predetermined pressure, up to the level of the line of the bottom surfaces of the bridge portions 7′ and 8, whereby the slag or ashes falling into the box is floated or kept in suspension for free discharge through the outlet, 11, so the choking of the box with the slag or ashes will be prevented and the discharge of the slag facilitated. A water feed pipe 12 is provided for supplying water under, say, twenty pounds pressure, to an inlet nozzle 13 arranged within the contracted forward end of the box, while a drain pipe 14 communicating with a drain nozzle 15 beneath the bridge 8 adjacent the rear end of the box is provided to allow the overflow water to discharge. By this means the pockets are ordinarily kept filled to a predetermined level and the excess water allowed to flow off, thus establishing a slow circulation of the water by which the heavier particles of the ashes or slag are prevented from being precipitated to the bottom of the box.

For the purpose of indicating at a distance the level of the water in the box, when the water rises above or below the normal level, I provide suitable indicating means. As shown in the present instance the waste or drain pipe 14 communicates with a sewer or other final drain outlet 16 while at a suitable point within the pipe 14 is provided a water box or chamber 17 within which is arranged a float 18. The float preferably comprises a hollow body having an upwardly extending guide member 19 movable vertically in a guide slot 20 in the top of the box 17 and carrying at its upper end a contact piece or switch member 21 suitably secured to said guide member and insulated therefrom, as shown at 22. The contact piece or switch member 21 is movable vertically between the upper and lower sets of contacts 23 and 23' and 24 and 24', the contacts 23 and 24 being connected with the proximate ends of conductors 25 and 26, while the contacts 23' and 24' are connected with a conductor 27. The conductors 25, 26 and 27 lead from the said contacts to a signal board 28, located at any desired distance from the furnace and form part of an alarm circuit including a bell 29 and high and low water lamps 30 and 31, together with a battery or other suitable source of electric energy 32. The conductors 25 and 26 form one side of the circuit, and the conductor 27 the opposite side thereof, and at the switch board the adjacent ends of the said conductors 25 and 26 are connected by a bridge or loop 33 which is connected between the lamps 30 and 31 by a conductor 34 with one of the binding posts of the magnet of the bell 29, to the other binding post of which the conductor 27 is connected. When the water in the slag or box is at the normal level, the float 18 occupies a normal position in the box 17 in which the contact piece 21 lies midway between the upper and lower sets of contacts 23 and 23' and 24 and 24', respectively, the said alarm and signal circuit being thereby normally out of action. If, however, the water should rise above the normal level, the contact piece 21 is brought into engagement with the contacts 23 and 23' and closes the alarm circuit through the conductor 25, lamp 30, conductor 34, and bell 29, whereby the lamp 30 is caused to glow and the bell 29 sounded, giving warning of the high condition, thereby giving a warning and signal that a high water condition exists. When however, the water in the slag box falls below the predetermined level, the float will descend and the contact piece 21 will engage the contacts 24 and 24' and establish a circuit through the conductor 26, lamp 31, conductor 34 and bell 29, thereby giving a warning of the low condition of the water. The operator is therefore automatically advised when the water rises or falls above or below the proper level, so that he may take measures to reduce or increase the level of the water in the slag boxes, accordingly.

Arranged for longitudinal movement within the slag box is a plunger rod 35 movable through a stuffing box 36 in the wall 7 and connected at its outer or rear end with the rod or stem 37 of a piston 38 movable within a fluid pressure cylinder 39. To the ends of this cylinder are connected pipes 40 and 41 adapted to serve alternately as supply and discharge pipes for the fluid pressure medium, such as water, which pipes are adapted to be alternately and simultaneously connected with feed and discharge pipes 42 and 43 by means of a suitable valve mechanism 44 which may be operated to cause the fluid pressure to flow through the pipe 40 to the cylinder and exhaust to take place from the cylinder through the pipe 41, and vice versa, thereby allowing the plunger rod 35 to be moved forwardly and rearwardly within the slag box.

Disposed within the slag box is a rabble or rake 45, comprising a plate carrying a central rib 46 to which is pivoted an elbow link 47 and a gravity latch 48, said latch having a beveled end portion 49 and a hook or shoulder to engage a lug or projection 50 on the link 47. The link is bifurcated at its point of connection with the rope 46 so that the rabble or rake may assume a downturned or normally horizontal position within the box, while adapting it to be held in a vertical or upright position by engagement of the latch 48 with the locking shoulder or lug 50. Normally the rabble or rake is disposed in a horizontal position at the forward end of the slag box, into which it is permitted to tilt through the medium of the pivotal connection formed by the link between said rake and the plunger rod 35, in which position the rake is inoperative and does not interfere with the free flow of the water or the outward travel of particles of the slag or ashes. When the rake is disposed in a vertical position and is locked by the latch 48 to the link 47, said rake will be coupled to the rod 35 for outward movement therewith to force and discharge the slag or ashes toward and outward through the outlet 11. An inclined trip 51 is disposed at the limit of outward movement of the latch member 48 for engagement with the beveled nose 49 of said latch member, whereby the latch member is retracted, allowing the rake 45 to tilt downwardly and rearwardly to normal position so that said rake may move backwardly to a returned position without disturbing the body of water or slag to any material degree.

Arranged within the contracted forward end of the box is a slag shear 52 comprising an inclined board or plate movable longitudinally beneath the shelf 71 and retained in a normal position by springs 54. This shear is recessed or cut away, as at 55, for the passage of a rope or cable 56 attached at one end to the bottom or lower edge of the rake 45, similar cables 57 being attached whereby the latter may be moved rearwardly against springs 54. The cable 56 passes around a guide pulley 58 disposed in advance of the shear, and thence extends backwardly through the box to the rear end thereof in parallel relation to the cables 57, which cables 56 and 57 thence pass respectively around guide pulleys 59 and 60 and outwardly through the outlet 11, a recess 61 being provided in the rabble or rake for the passage of said cables when the rake is in upright position, which recess permits the rake to be swung between the vertical and horizontal without interference from the cables, as will be readily understood. The function of the shear 52 is to serve as an auxiliary rake or clearing device, whereby the slag or ashes collecting under the bridge 7' may be loosened up and forced out from beneath said bridge and into the path of the rake for discharge by the latter.

Arranged at a suitable point exteriorly of the furnace is a frame or tower 62 provided with suitable guideways 63 and 64 in which travel controlling weights or carriages 65 and 66. These carriages are respectively attached to the outer ends of the cables 56 and 57 which depend from and pass around guide pulleys 58' and 59' at the top of the tower. The carriage 65 carries an armature plate 67 for coöperation with an electromagnet 68, disposed at the base of the guideway 64, while the carriage 66 is coupled to an operating or controlling device comprising a piston 69 movable within a fluid pressure cylinder 70 having a combined inlet and outlet 71. Connected with said inlet and outlet 71 is a valve casing 72 communicating with fluid feed discharge pipes 73 and 74 and containing a rotary valve 75 movable to different positions to control communication between the connection 71 and pipe 73 or between said connection 71 and the pipe 74.

The valve stem is provided with a crank arm 76 to which is connected a spring 77 operating to normally hold the valve in the second-named position, and said crank arm is also connected with the movable core of a solenoid 78. A portion of the guideway 63 includes a conductor bar or rail 79 suitably insulated from the frame structure and electrically connected with a contact shoe 80 carried by and insulated from the carriage 65.

The bar or rail 79 is included in an indicating circuit comprising main conductors 82 and 83 leading from the signal board 28 and connected with a suitable source of current supply. One of these conductors, namely the conductor 82, is connected with the rail 79 and one pole of the magnet 68, with the opposite pole of which is connected a conductor 83, leading to one of the poles of the magnet 78, from the opposite pole of which leads a conductor 84 to a contact plate 85. The contact plate 85 is arranged in proximity to the magnet 68 and below a series of contacts 86, 87, 88, 89 and 90, any suitable number of which may be employed, which contact plates are respectively connected by conductors 86', 87', 88', 89', and 90', connected in parallel at the signal board with a bridge 91 connected with the main conductor 81, in which branches are arranged signal lamps 86ª, 87ª, 88ª, 89ª, and 90ª, disposed in superposed relation to correspond with the relative positions of the contacts 86 to 90, inclusive. As shown, the conductor bar or rail 79 is arranged for engagement at all times with the contact shoe 80, and also, as shown, the contact plates 85 to 90, inclusive are connected with each other and with the conductor 81 by a conductor 81ª. The contact 90 is also connected with the main conductor 81, and also connected with said main conductor 81 is a conductor 92 leading to a contact 93 adapted to be engaged by a switch member 94 connected with a conductor 95 connected with the bridge 91 and containing a signal lamp 96, said switch member 94 being movable to closed position by the action of a weight or carriage 66 when the latter is in a stated position.

When the parts are in their normal positions the carriage 2 is at the limit of its downward travel with its contact shoe 80 disposed below and out of engagement with the contact plate 86 and the armature plate 67 resting upon the magnet 68, while the carriage 66 and the piston 69 are at the limit of their upward movements and the valve 75 connects the cylinder 70 with the outlet pipe 74.

When the valve 44 is operated to connect the source of fluid pressure supply through the pipe 41 with the inner end of the cylinder 8, and to connect the outer end of said cylinder through the pipe 40 exhaust pipe 43, the fluid pressure entering the cylinder will force the piston outwardly within said cylinder. The plunger rod 35 will thereupon be drawn upon to slide the rake 45 outward. The rake during the first portion of its outward movement will draw upon the cable 56, whereby the carriage 65 will be elevated sufficiently to bring the shoe 80 into engagement with the contact 85, whereupon a circuit will be established through the bar or rail 79, shoe 80, contact plate 85, conductor 84, magnet 78, conductor 83 and conductor 82, whereby the magnet 68 is energized and will attract the armature 67 and hold the carriage 65 against upward movement. The cable 56 will thus be held from movement under the pull of the plunger 35 and as a result the rake 45 will be swung with the link 47 to operative positions, in which the rake is vertically and the link horizontally disposed, the latch 48 thereupon engaging the lug 40 by gravity and rigidly locking the rake to the plunger rod. At the same time that the magnet 68 is energized the magnet 78 is energized so that its core will swing the crank arm 76 downward and tension the spring 77, thus opening the valve 75 for the flow of fluid pressure from the pipe 73 to the cylinder 70 downward, whereby the carriage 66 in forced downward, thus drawing on the cables 57 to swing the shear 52 outward and tension the springs 54 for the subsequent return of said shear to normal position. On its downward movement the carriage 66 will throw the switch 94 into engagement with the contact 93 thus closing a circuit through the conductors 92 and 95 to light the lamp 96, indicating that the above described movements of the rake and shear have taken place. The rake when thus moved upwardly is disposed to sweep the slag or ashes toward the outer end of the slag pockets and as it moves rearwardly carries the slag with it and discharges the same through the outlet 11. When the latch 48 fixes the rake in a vertical position to the rod 35 and the rake moves outward the cable 56 is positively pulled to elevate the carriage 65 against the resistance of the magnet 68, and upon the passage of the shoe 80 out of contact with the plate 65 the magnets 68 and 78 are deënergized, the spring 77 thereupon returning the valve 75 to closed or exhaust position, while the springs 54 return the shear 52 to normal position, whereby the cables 57 are drawn upon to again lift the carriage 66, which releases the switch 54, whereupon the lamp 96 ceases to glow. The carriage 65 on the outward travel of the rake is gradually moved upward and at different points in its path of travel the shoe 80 engages the contact plates 86, 87, 88, 89 and 90 and successively lights the lamps 86ᵃ, 87ᵃ, 88ᵃ, 89ᵃ and 90ᵃ, indicating at the switch board the positions of the rake in its course of travel within the slag box. When the rake reaches the limit of its outward movement, as shown by the glow of the lamp 90ᵃ, the beveled nose 49 of the latch 48 comes in contact with the trip 51 which releases the latch from engagement with the keeper lug 50, whereupon the rake drops back to its normal position under the action of the weighted carriage 65, which descends, it being understood that as soon as the lamp 90ᵃ glows the operator adjusts the valve 44 to connect the pipe 41 with the exhaust pipe 43 and to connect the pipe 40 with the feed pipe 42, so that fluid pressure will be supplied to the outer end of the cylinder 38 to force the plunger 35 on its return movement, while allowing the fluid pressure admitted to the inner end of the cylinder 38 to exhaust. The rake 45 thus dropped back to a horizontal or folded and inoperative position is moved backward to its original position at the inner end of the slag box, and the carriage 65 continues to descend until it returns to its normal position originally described, the shoe 80 in its descent engaging the contact plates and lighting the lamps upon the switch board in inverse order. In thus returning or moving back in a horizontal or edgewise position the rake moves with a minimum of resistance through the water, thus avoiding agitation of the water and precipitation of the heavier particles of the remaining ashes therein. When the lamp 86ᵃ finally glows the operator after a short interval moves the valve 44 to neutral position, thus cutting off the flow of fluid pressure to the outer end of the cylinder 38, whereupon the parts of the apparatus will be disposed in normal position, with the fluid pressure cut off, ready for repetition of the above described operation. It will be understood that the raking operation may be carried out as often as desired or whenever necessary for the removal of the slag or ashes to prevent the same from accumulating unduly in the slag pocket and injuring or interfering with the proper operation of the furnace. It will also be understood that the signal mechanism described allows the slag removing elements to be operated at a distance from the furnace.

If desired, the valve or valves 44 may be operated automatically by a suitable mechanical means at timed intervals. By the use of a water filled slag box, the slag is cooled and kept in condition for ready discharge, and by provision of the slag discharging means the slag pockets are prevented from filling up and causing well known objections, among them the clogging of the checkers and destruction of the division walls through the presence of the slag and undue concentration of the heat.

Other advantages of the invention will be apparent to those versed in the art.

I claim:—

1. In a furnace of the character described, a slag box, means for supplying water thereto and maintaining the water at a predetermined level therein, a slag discharging rake movable longitudinally within the box, said rake being adjustable to a vertical position on its discharge motion and to a horizontal position on its return motion, and means for operating and adjusting said rake.

2. In a furnace of the character described, a slag box, a slag discharging rake movable longitudinally within the box, a shear arranged within the box, and means for actuating the shear and rake.

3. In a furnace of the character described, a slag box, means for supplying water thereto and maintaining a predetermined water level therein, a slag discharging rake movable longitudinally within the box, a slag shear within the box, and means for actuating the rake and shear.

4. In a furnace of the character described, a slag box, a rake disposed within and movable longitudinally of the box, said rake being adjustable to a vertical position on its discharge motion and to a horizontal position on its return motion, a shear within the box, means for operating and adjusting the rake, and means controlled by the rake for actuating the shear.

5. In a furnace of the character described, a slag box, means for maintaining a predetermined water level therein, a plunger rod movable longitudinally within the box, means for actuating the same, a rake pivotally connected with the rod for adjustment to a vertical position on its discharge motion and to a horizontal position on its return motion, a latch for holding the rake in vertical position, means for shifting the rake to a vertical position on its discharge motion, and means for releasing the latch and returning the rake to horizontal position on its return motion.

6. In a furnace of the character described, a slag box, means for maintaining a predetermined water level therein, a movably mounted shear at the inner end of the slag box, means for maintaining the same in an inoperative position, a rake movable longitudinally within the box, said rake being adjustable to a vertical position on its discharge motion to a horizontal position on its return motion, means for operating the rake and adjusting the same as described, and means operative on the discharge motion of the rake to actuate the shear.

7. In a furnace of the character described, a slag box, means for maintaining a predetermined water level therein, a longitudinally movable plunger in the box, a rake pivotally connected with the plunger for adjustment to vertical and horizontal positions, and means for operating the plunger, a weighted element and cable connected with the rake for shifting it from a horizontal to a vertical position on its discharge motion, a latch for maintaining the rake in a vertical position, means for retracting the latch at the limit of discharge motion of the rake, whereby the weighted element is adapted to return the rake to a horizontal position, and means controlled by the weighted element for indicating the positions of the rake within the slag box.

8. In a furnace of the character described, a slag box, a rake longitudinally movable therein and adjustable between the vertical and horizontal, means for shifting the rake backward and forward, means including a weighted traveling element for adjusting the rake, and an electrically indicating means controlled by said traveling element for indicating the position of the rake.

9. In a furnace of the character described, a slag box, a rake movable longitudinally therein and adjustable between the vertical and the horizontal, means for moving the rake backward and forward in the slag box, means including a weighted element for adjusting the rake, electrically indicating means controlled by the weighted element for indicating the position of the rake within the box, a shear within the box normally maintained in an inoperative position, and an electromechanical means controlled by the aforesaid weighted element for actuating said shear.

In testimony whereof I affix my signature in presence of two witnesses.

WALTER A. KOSINSKI.

Witnesses:
 GEORGE SCHOTT,
 LOUIS A. ZUCHOWSKI.

Copies of this patent may be obtained for five cents each, by addressing the "Commissioner of Patents, Washington, D. C."